United States Patent [19]

Han

[11] Patent Number: 6,148,114
[45] Date of Patent: *Nov. 14, 2000

[54] RING DILATION AND EROSION TECHNIQUES FOR DIGITAL IMAGE PROCESSING

[75] Inventor: Ke Han, San Francisco, Calif.

[73] Assignee: Ultrapointe Corporation, San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/757,490

[22] Filed: Nov. 27, 1996

[51] Int. Cl.$^7$ .................................................. G06K 9/42
[52] U.S. Cl. ............................................................ 382/256
[58] Field of Search ...................... 382/256, 257, 382/149, 147, 199, 204

[56] References Cited

U.S. PATENT DOCUMENTS

| | | |
|---|---|---|
| H1530 | 5/1996 | Lee .......................................... 395/124 |
| Re. 34,214 | 4/1993 | Carlsson et al. .......................... 358/93 |
| 2,758,502 | 8/1956 | Scott et al. . |
| 2,969,708 | 1/1961 | Polanyi et al. . |
| 3,013,467 | 12/1961 | Minsky . |
| 3,049,047 | 8/1962 | Polanyi et al. . |
| 3,187,627 | 6/1965 | Kapany . |
| 3,360,659 | 12/1967 | Young . |
| 3,497,694 | 2/1970 | Jura et al. ................................. 250/202 |
| 3,602,572 | 8/1971 | Norriss ......................................... 350/7 |
| 3,705,755 | 12/1972 | Baer ............................................ 350/6 |
| 3,719,776 | 3/1973 | Fujiyasu et al. ....................... 178/6.7 R |
| 3,764,512 | 10/1973 | Greenwood et al. ................... 204/299 |
| 3,775,735 | 11/1973 | Funk et al. .............................. 340/4 R |

(List continued on next page.)

FOREIGN PATENT DOCUMENTS

| | | |
|---|---|---|
| 0112401 | 7/1984 | European Pat. Off. . |
| 0155247 | 9/1985 | European Pat. Off. . |
| 1232367 | 1/1967 | Germany . |
| 2360197 | 6/1975 | Germany . |
| 2655525 | 6/1978 | Germany . |
| 3243890 | 6/1983 | Germany . |
| 487318 | 6/1938 | United Kingdom . |
| 1185839 | 3/1970 | United Kingdom . |
| 2132852 | 7/1984 | United Kingdom . |
| 2152697 | 8/1985 | United Kingdom . |
| 2184321 | 6/1987 | United Kingdom . |
| WO 79/01027 | 11/1979 | WIPO . |

OTHER PUBLICATIONS

John C. Russ, "The Image Processing Handbook", Second Edition, pp. 396–397, Dec. 1995.

(List continued on next page.)

*Primary Examiner*—Yon J. Couso
*Attorney, Agent, or Firm*—Skjerven, Morrill, MacPherson LLP; Alan H. MacPherson; Gary J. Edwards

[57] ABSTRACT

Dilation and erosion operations are performed on imaged objects that are represented using a number of object pixels; the object pixels are a subset of a larger number of image pixels. A ring-shaped structuring element is specified by a radius and an origin. In the ring dilation operation, the boundary of the structuring element includes two concentric circles, one having a radius that is one pixel greater than the other so that the boundary is two-pixels wide. The origin of a copy of the structuring element is then overlaid onto each object pixel such that the boundaries of the copies intersect to form a dilated image feature. The image feature includes a feature boundary defined by the outermost portions of the boundaries of the overlapping copies of the structuring element. This feature boundary is identified and described using conventional chain-coding techniques. The dilation is then completed by filling an area defined within the feature boundary. To erode objects, a second ring-shaped structuring element is specified by a second origin and by a second radius. The origin of a copy of the second structuring element is overlaid onto each pixel within the object. A pixel within the object is selected only if the boundary of the copy of the second structuring element lies completely within the object when the origin of the copy is overlaid onto that pixel. The selected pixels represent an eroded version of the object.

10 Claims, 8 Drawing Sheets

U.S. PATENT DOCUMENTS

| | | | |
|---|---|---|---|
| 3,782,823 | 1/1974 | Kantorski et al. | 356/85 |
| 3,790,281 | 2/1974 | Kessler et al. | 356/72 |
| 3,813,140 | 5/1974 | Knockeart | 350/7 |
| 3,926,500 | 12/1975 | Frosh et al. | 350/17 |
| 3,947,628 | 3/1976 | Allen et al. | 178/6.8 |
| 3,980,818 | 9/1976 | Browning | 178/6.6 R |
| 4,045,772 | 8/1977 | Bouton et al. | 340/146.3 B |
| 4,063,226 | 12/1977 | Kozma et al. | 365/125 |
| 4,068,381 | 1/1978 | Ballard et al. | 33/1 R |
| 4,111,557 | 9/1978 | Bouton et al. | 340/146.3 |
| 4,125,828 | 11/1978 | Resnick et al. | 340/146.3 |
| 4,141,032 | 2/1979 | Haeusler | 358/89 |
| 4,160,263 | 7/1979 | Christy et al. | 358/1 |
| 4,194,217 | 3/1980 | Van den Bosch | 358/93 |
| 4,198,571 | 4/1980 | Shepperd | 250/571 |
| 4,207,554 | 6/1980 | Resnick et al. | 340/146.3 |
| 4,211,924 | 7/1980 | Muller et al. | 250/311 |
| 4,218,112 | 8/1980 | Ruker | 350/8 |
| 4,223,354 | 9/1980 | Noble et al. | 358/233 |
| 4,236,179 | 11/1980 | Dreyfus et al. | 358/93 |
| 4,240,692 | 12/1980 | Winston | 350/960.1 |
| 4,247,203 | 1/1981 | Levy et al. | 356/398 |
| 4,255,971 | 3/1981 | Rosencwaig | 73/606 |
| 4,284,897 | 8/1981 | Sawamura et al. | 250/461 B |
| 4,311,358 | 1/1982 | Gibbons et al. | 350/91 |
| 4,314,763 | 2/1982 | Steigmeier et al. | 356/237 |
| 4,333,838 | 6/1982 | Ballnus | 210/614 |
| 4,342,905 | 8/1982 | Fujii et al. | 250/201 |
| 4,343,993 | 8/1982 | Binning et al. | 250/306 |
| 4,347,001 | 8/1982 | Levy et al. | 356/398 |
| 4,348,263 | 9/1982 | Draper et al. | 204/29 |
| 4,350,892 | 9/1982 | Kay et al. | 250/461.2 |
| 4,354,114 | 10/1982 | Karnaukhov et al. | 250/458.1 |
| 4,362,943 | 12/1982 | Presby | 250/459.1 |
| 4,366,380 | 12/1982 | Mirkin | 250/306 |
| 4,379,135 | 4/1983 | Sasaki et al. | 436/536 |
| 4,379,231 | 4/1983 | Shii et al. | 250/311 |
| 4,381,963 | 5/1983 | Goldstein et al. | 156/245 |
| 4,405,237 | 9/1983 | Manuccia et al. | 356/301 |
| 4,406,015 | 9/1983 | Koga | 378/50 |
| 4,406,525 | 9/1983 | Itoh et al. | 350/486 |
| 4,407,008 | 9/1983 | Schmidt et al. | 358/93 |
| 4,448,532 | 5/1984 | Joseph et al. | 356/394 |
| 4,455,485 | 6/1984 | Hosaka et al. | 250/234 |
| 4,485,409 | 11/1984 | Schumacher | 358/294 |
| 4,532,650 | 7/1985 | Wihl et al. | 382/8 |
| 4,549,204 | 10/1985 | Bertero et al. | 358/93 |
| 4,555,798 | 11/1985 | Broadbent, Jr. et al. | 382/8 |
| 4,556,317 | 12/1985 | Sandland et al. | 356/237 |
| 4,579,455 | 4/1986 | Levy et al. | 356/394 |
| 4,604,910 | 8/1986 | Chadwick et al. | 74/96 |
| 4,618,938 | 10/1986 | Sandland et al. | 364/552 |
| 4,631,581 | 12/1986 | Carlsson | 358/93 |
| 4,633,504 | 12/1986 | Wihl | 382/554 |
| 4,636,069 | 1/1987 | Balasubramanian | 356/71 |
| 4,639,587 | 1/1987 | Chadwick et al. | 250/201 |
| 4,644,172 | 2/1987 | Sandland et al. | 250/548 |
| 4,733,063 | 3/1988 | Kimura et al. | 250/201 |
| 4,758,094 | 7/1988 | Wihl et al. | 356/394 |
| 4,786,170 | 11/1988 | Groebler | 356/318 |
| 4,805,123 | 2/1989 | Specht et al. | 364/559 |
| 4,818,110 | 4/1989 | Davidson | 356/358 |
| 4,827,125 | 5/1989 | Goldstein | 250/234 |
| 4,844,617 | 7/1989 | Kelderman et al. | 356/372 |
| 4,845,373 | 7/1989 | Jamieson et al. | 250/548 |
| 4,845,558 | 7/1989 | Tsai et al. | 358/106 |
| 4,863,226 | 9/1989 | Houpt et al. | 350/6.5 |
| 4,863,252 | 9/1989 | McCarthy et al. | 350/507 |
| 4,877,326 | 10/1989 | Chadwick et al. | 356/394 |
| 4,926,489 | 5/1990 | Danielson et al. | 382/8 |
| 4,957,367 | 9/1990 | Dulman | 356/359 |
| 5,030,008 | 7/1991 | Scott et al. | 356/394 |
| 5,032,735 | 7/1991 | Kobayashi et al. | 250/572 |
| 5,034,613 | 7/1991 | Denk et al. | 250/458.1 |
| 5,035,476 | 7/1991 | Ellis et al. | 350/6.5 |
| 5,046,847 | 9/1991 | Nakata et al. | 356/338 |
| 5,084,612 | 1/1992 | Iwasaki et al. | 250/216 |
| 5,091,652 | 2/1992 | Mathies et al. | 250/458.1 |
| 5,112,129 | 5/1992 | Davidson | 356/359 |
| 5,117,466 | 5/1992 | Buican et al. | 382/6 |
| 5,119,434 | 6/1992 | Bishop et al. | 382/147 |
| 5,122,648 | 6/1992 | Cohen et al. | 250/201.3 |
| 5,122,653 | 6/1992 | Ohki | 250/216 |
| 5,127,726 | 7/1992 | Moran | 356/237 |
| 5,127,730 | 7/1992 | Brelje et al. | 356/318 |
| 5,129,010 | 7/1992 | Higuchi et al. | 356/376 |
| 5,153,428 | 10/1992 | Ellis | 250/234 |
| 5,162,641 | 11/1992 | Fountain | 250/201.2 |
| 5,243,406 | 9/1993 | Ando et al. | 356/394 |
| 5,280,452 | 1/1994 | Ozeki et al. | 382/8 |
| 5,289,267 | 2/1994 | Busch et al. | 356/394 |
| 5,306,902 | 4/1994 | Goodman | 250/201.3 |
| 5,311,598 | 5/1994 | Bose et al. | 382/149 |
| 5,355,212 | 10/1994 | Wells et al. | 356/237 |
| 5,438,413 | 8/1995 | Mazor et al. | 356/363 |
| 5,438,417 | 8/1995 | Busch et al. | 356/394 |
| 5,448,364 | 9/1995 | Moran | 356/430 |
| 5,465,145 | 11/1995 | Nakashige et al. | 356/237 |
| 5,479,252 | 12/1995 | Worster et al. | 356/237 |
| 5,483,055 | 1/1996 | Thompson et al. | 250/201.3 |
| 5,502,306 | 3/1996 | Meisburger et al. | 250/310 |
| 5,537,669 | 7/1996 | Evans et al. | 382/141 |
| 5,563,702 | 10/1996 | Emery | 356/73 |
| 5,572,598 | 11/1996 | Wihl et al. | 382/144 |
| 5,578,821 | 11/1996 | Meisberger et al. | 250/310 |
| 5,583,632 | 12/1996 | Haga | 356/129 |
| 5,621,532 | 4/1997 | Ooki et al. | 356/444 |
| 5,627,646 | 5/1997 | Stewart et al. | 356/371 |
| 5,671,056 | 9/1997 | Sato | 356/376 |
| 5,680,207 | 10/1997 | Hagiwara | 356/237 |
| 5,684,509 | 11/1997 | Hatanaka et al. | 382/256 |
| 5,799,113 | 8/1998 | Lee | 382/256 |

OTHER PUBLICATIONS

G. J. Brakenhoff, "Imaging Modes in Confocal Scanning Light Microscopy (CSLM)", Journal of Microscopy, vol. 117, Pt. 2, Nov. 1979, pp. 233–242.

"The Yield Manager System", Knights Technology, 1996 (4 pages).

Technical Brief, "The KLA SAT", KLA Instruments Corporation, Wafer Inspection Division, 1996 (2 pages).

Gonzalez et al., "Digital Image Processing", Addison–Wesley Publishing Company, 1992, pp. 185–187 and 446–456.

"Working Together", Knights Technology, Inc., Nov. 1995 (8 pages).

A. F. Slomba et al., "A Laser Flying Spot Scanner for Use in Automated Fluorescence Antibody Instrumentation", Journal of the Association for the Advancement of Medical Instrumentation, vol. 6, No. 3, May–Jun. 1972, pp. 230–234.

Max Born et al., "Principles of Optics," Pergamon Press, London, 1959, p. 417.

I. J. Cox et al., "Scanning Optical Microscope Incorporating a Digital Framestore and Microcomputer", Applied Optics, vol. 22, No. 10, May 15, 1983, pp. 1474–1478.

Paul Davidovits, "Scanning Laser Microscope", NATURE, vol. 223, Aug. 23, 1969, pp. 831.

Paul Davidovits et al., "Scanning Laser Microscope for Biological Investigations", Applied Optics, vol. 10, No. 7, Jul. 6, 1971, pp. 1615–1619.

G. J. Brakenhoff et al., "Confocal Scanning Light Microscopy with High Aperture Immersion Lenses", Journal of Microscopy, vol. 117, Pt. 2, Nov. 1979, pp. 219–232.

"Merlin's Framework", Knights Technology, Inc., Jul. 1997 (4 pages).

"Knightline", Knights Technology, Inc., Winter 1995 (6 pages).

Louis Breaux, et al., "Integration of Automated Defect Classification into Integrated Circuit Manufacturing", 1944 IEEE/SEMICONDUCTOR Advanced Semiconductor Manufacturing Conference, pp. 290–292.

Kenneth R. Castleman, "Digital Image Processing", Prentice–Hall, Inc., 1979, pp. 351–359.

I. J. Cox et al., "Digital Image Processing of Confocal Images", Image and Vision Computing, Butterworth & Co., Ltd., 1983, pp. 52–56.

I. J. Cox et al., "Electronic Image Processing of Scanning Optical Microscope Images", International Conference on Electronic Image Processing, Jul. 26–28, 1982, pp. 101–104.

D. K. Hamtilon et al., "Three Dimensional Surface Measurement Using the Confocal Scanning Microscope", Applied Physics, B27, 1982, pp. 211–213.

D. K. Hamilton et al., "Experimental Observations of the Depth–Discrimination Properties of Scanning Micrope", Optics Letters, vol. 6, No. 12, Dec. 1981, pp. 625–626.

Gerd Hausler et al., "Imaging with Expanded Depth of Focus", Zeiss Information, No. 98E, Oberkochen 19, 1986–87, pp. 9–13.

Youling Lin, "Techniques for Syntactic Analysis of Images with Application for Automatic Visual Inspection", Ph.D. Dissertation, Texas Tech University, 1990.

H. J. B. Marsman et al., "Mechanical Scan System for Microscopic Applications", Review of Scientific Instruments, vol. 54, Aug. 1983, pp. 1047–1052.

H. M. Nier, "Automatic Moving Part Measuring Equipment", IBM Technical Disclosure Bulletin, vol. 22, No. 7, Dec. 1979, pp. 2856–2857.

Mojmir Petran et al., "Tandem–Scanning Reflected Light Microscope", Journal of the Optical Society of America, vol. 58, No. 5, May 1968, pp. 661–664.

C. J. R. Sheppard et al., "Depth of Field in the Scanning Microscope", Optics Letters, vol. 3, No. 3, Sep. 1978, pp. 115–117.

C. J. R. Sheppard et al., "Optical Microscopy with Extended Depth of Field", Proc. R. Soc. Lond, A., vol. 387, 1983, pp. 171–186.

Shura Agadshanyan et al., "MORPHOQUANT–An Automatic Microimage Analyzer of the JENA Optical Works", Jena Review, Jr. 6, 1977, pp. 270–276.

Philip G. Stein, "Image–Analyzing Microscope", Analytical Chemistry, vol. 42, No. 13, Nov. 1970, pp. 103A–106A.

V. Wilke et al., "Laser–Scan–Mikroskop", Laser–Anwendung, Nr., Feb. 1983, pp. 93–101.

T. Wilson et al., "Dynamic Focusing in the Confocal Scanning Microscopic", Journal of Microscopy, vol. 128, Pt. 2, Nov. 1982, pp. 139–143.

Frederick Y. Wu et al., "Automated Classification of Defects in Integrated Circuit Manufacturing ", IBM T. J. Watson Research Center, Yorkton Heights, NY, pp. 109.

"The Engineering Index Annual", 1983, pp. 3434, 4491.

IBM Technology, Disclosure Bulletin, vol. 18, No. 12, 1976, pp. 4174.

RING DILATION AND EROSION TECHNIQUES FOR DIGITAL IMAGE PROCESSING

CROSS-REFERENCES TO RELATED APPLICATIONS

The present application is related to the commonly owned application Ser. No. 08/497,162, filed on Jun. 30, 1995 now abandoned, entitled "Method for Characterizing Defects on Semiconductor Wafers," by Ken K. Lee, et al.

BACKGROUND

Most morphological operations can be defined in terms of two fundamental image-processing operations, dilation and erosion. As their names imply, the dilation operation expands image features, while the erosion operation contracts them. These conventional operations are described below in connection with FIGS. 1A and 1B; for a detailed explanation of conventional dilation and erosion, see pp. 518–560 of Gonzales and Wood, "Digital Image Processing," Addison-Wesley 1992), which is incorporated herein by reference.

FIG. 1A depicts an image 100, which includes a plurality of random pixels 110, and a structuring element 120 of radius r. The dilation of image 100 by structuring element 120 is conventionally accomplished by superimposing the origin (e.g., the center) of element 120 sequentially over each of pixels 110. The dilation operation then selects each image pixel covered by element 120. Whether element 120 covers a given image pixel is determined by comparing the location of that image pixel with the locations of the pixels defined within element 120. FIG. 1B depicts image 100 after dilation using element 120. Each of pixels 110 is shown included within a disk 130 of selected image pixels. Each disk 130 has a radius equal to the radius of element 120. overlapping groups of disks 130 create a pair of objects 140 and 150.

FIG. 2A depicts objects 140 and 150 and the isolated disk 130, all of FIG. 1B, undergoing a conventional erosion process. A structuring element 200 of radius ∈ is provided for the erosion. The erosion of objects 140 and 150 and the isolated disk 130 by structuring element 200 is conventionally accomplished by superimposing the origin (e.g., the center) of element 200 over each object pixel of image 100. The only pixels selected by the erosion process are those at which structuring element 200, when centered on the pixel, lies completely within one of object 140, object 150, or the isolated disk 130. Whether element 200 lies completely within one of object 140, object 150, or the isolated disk 130 is determined by comparing the location of each pixel of element 200 with the locations of corresponding pixels of image 100. The results of such erosion are illustrated in FIG. 2B as objects 210, 220, 230, and 240.

The trouble with conventional dilation and erosion techniques is that they are relatively computation intensive. For an image of n pixels, either dilation or erosion requires on the order of $n^3$ individual pixel comparisons. There is therefore a need for faster methods of image dilation and erosion.

SUMMARY

The present invention is directed to morphological operations that address the need for faster methods of image dilation and erosion. As with conventional dilation and erosion operations, the methods in accordance with the present invention are performed on imaged objects that are represented using a number of object pixels that are a subset of a larger number of image pixels.

In accordance with one embodiment of the invention, a ring-shaped structuring element is specified by a radius and an origin. The boundary of the structuring element include two concentric circles, one having a radius that is one pixel greater than the other so that the boundary is two-pixels wide. The origin of a copy of the structuring element is then overlaid onto each object pixel such that the boundaries of the copies intersect to form a dilated image feature. The image feature includes a feature boundary defined by the outermost portions of the boundaries of the overlapping copies of the structuring element. This feature boundary is identified and described using a conventional chain-coding technique. The dilation is then completed by filling in the feature boundary.

Another embodiment of the invention may be used to erode image objects, such as the dilated object of the foregoing example. In accordance with that embodiment, a second ring-shaped structuring element is specified by a radius and an origin. To erode an object, the origin of a copy of the second structuring element is overlaid onto each pixel within the object. Pixels within the object are selected only if the boundary of the copy of the second structuring element lies completely within the object when the origin of the copy is overlaid onto that pixel. The selected pixels then represent an eroded version of the object.

Using dilation and erosion techniques of the prior art, the number of pixel comparisons is proportional to the number of pixels required to specify a disk ($\pi r^2$). In contrast, the number of pixel comparisons required using the techniques in accordance with the present invention is proportional to the number of pixels required to specify a ring ($2\pi r$). The resulting decrease in the number of necessary comparison operations greatly increases the speed at which the dilation and erosion operations may be completed: the need for faster methods of image dilation and erosion is satisfied.

BRIEF DESCRIPTION OF THE FIGURES

These and other features, aspects, and advantages of the present invention will become better understood with regard to the following description, appended claims, and accompanying figures, where:

DETAILED DESCRIPTION

Figure 3:
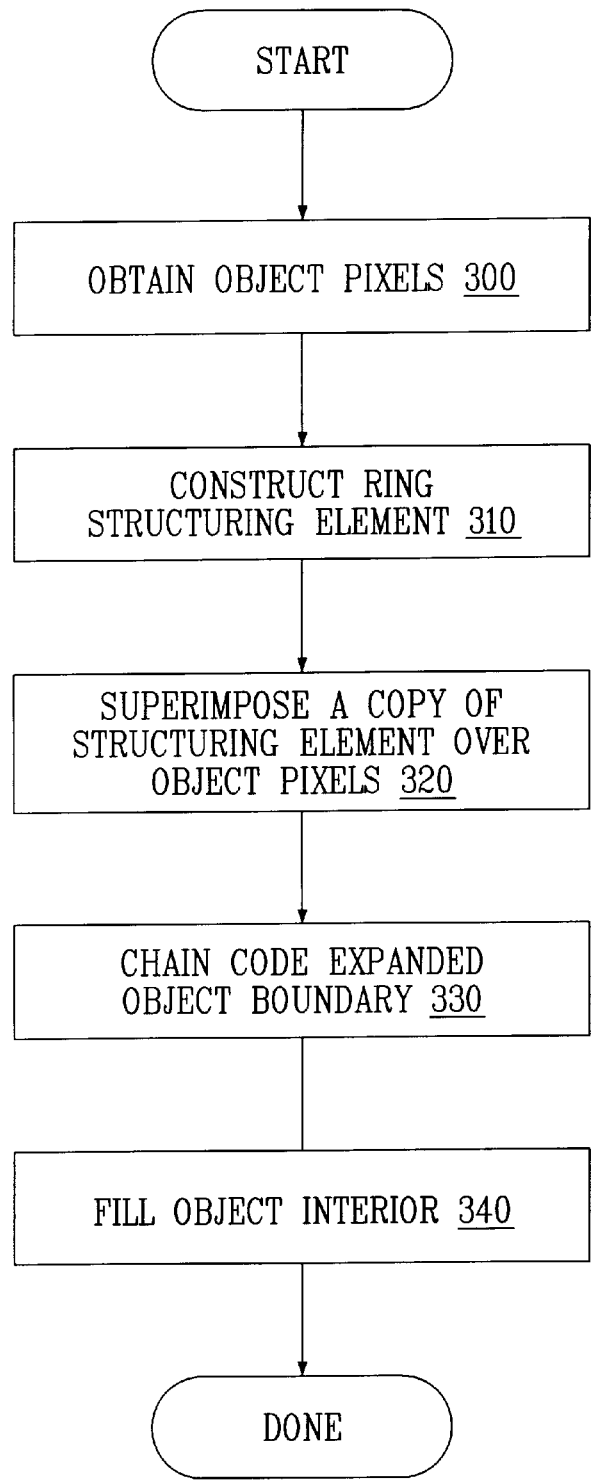
FIG. 3 is a flowchart depicting a dilation process in accordance with the present invention.

FIG. 3 is a flowchart depicting a dilation process in accordance with the present invention. The dilation process of FIG. 3 is described in connection with FIGS. 4A, 4B, 4C, 4D, and 4E.

Figure 4A:
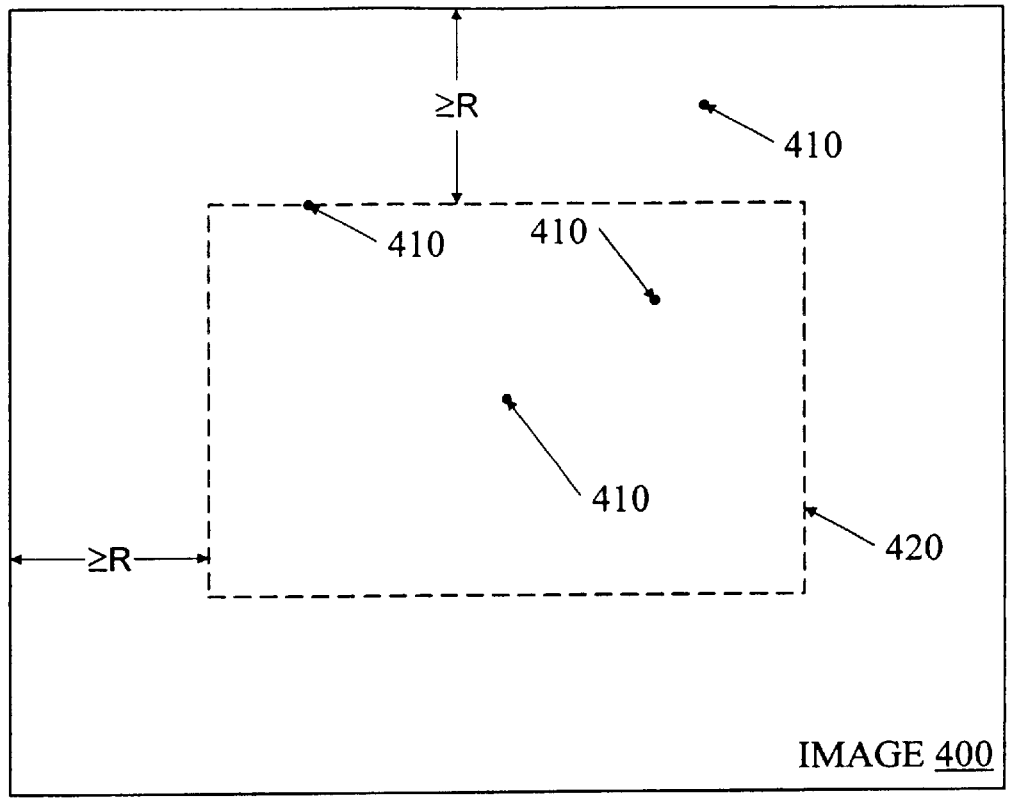
FIGS. 4A–4E graphically depict the dilation process of FIG. 3.

Beginning at step 300, a digital image 400 containing one or more objects to be dilated is obtained and represented using conventional techniques. In the present example, the objects to be dilated are a plurality of random pixels 410 within a border 420 (FIG. 4A).

Figure 4B:
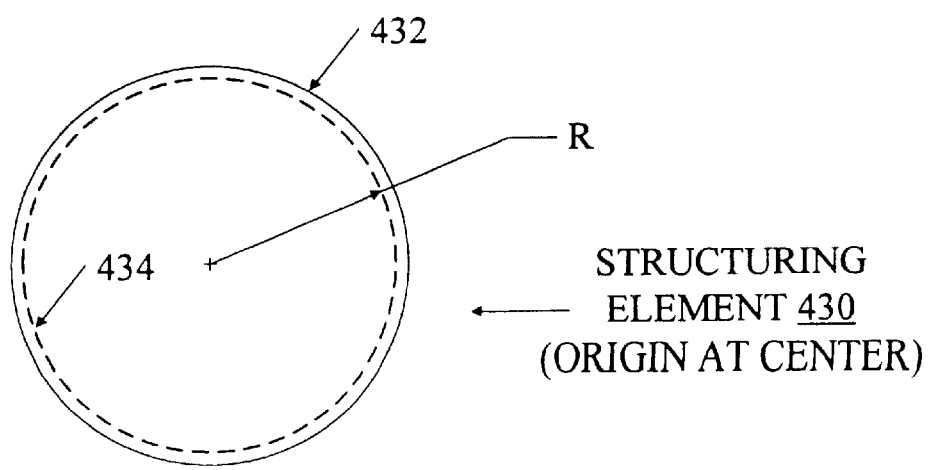

Next, in step 310 a ring-shaped structuring element 430 is constructed. Structuring element 430 has a central origin and a radius R (FIG. 4B). The boundary of structuring ring 430 includes an outer ring 432, specified by a solid line, and an inner ring 434, specified by a dashed line. Rings 432 and 434 are adjacent and are each one pixel wide. Thus, rings 432 and 434 combined form a single two-pixel-wide boundary.

Figure 4C:
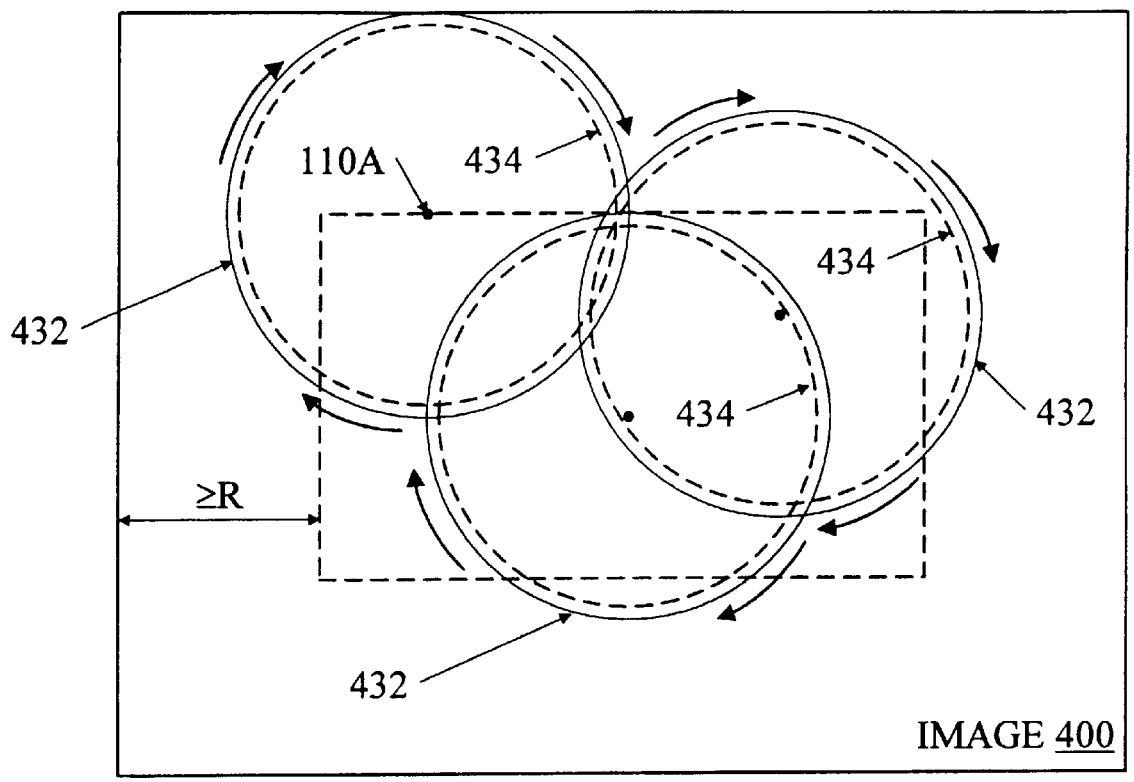

In accordance with the present invention, each of pixels 410 within border 420 is dilated using a copy of structuring element 430 (step 320). This is done by superimposing a copy of structuring element 430 concentricity over each of pixels 410 within border 420 as illustrated in FIG. 4C. Border 420 is separated from the edges of image 400 by a distance greater than or equal to the radius of the outer ring 432 of structuring element 430 to ensure that the dilated object resulting from a dilation of pixels 410 fits within image 400. Pixels 410 outside the border 420 are ignored.

In step 330, the outermost boundary 440 (FIGS. 4C and 4D) of the overlapping copies of structuring element 420 is then traced and represented using a conventional chain-coding scheme such as that described on pp. 484–486 of Rafael C. Gonzalez and Richard E. Woods "Digital Image Processing," Addison-Wesley (1992), which is incorporated herein by reference. The outermost boundary 440 is detected by traversing image 400 from left-to-right and top-to-bottom until an object pixel is encountered. The chain-coding scheme then traverses the outermost boundary 440 as illustrated by the curved arrows of FIG. 4C. At each junction of two or more outer rings 432, the corresponding inner 434 enables the chain-coding scheme to select the appropriate path along outermost boundary 440. In effect, inner rings 434 "trick" the conventional chain coding scheme into seeing the concentric rings 432 and 434 as solid disks.

Figure 4D:
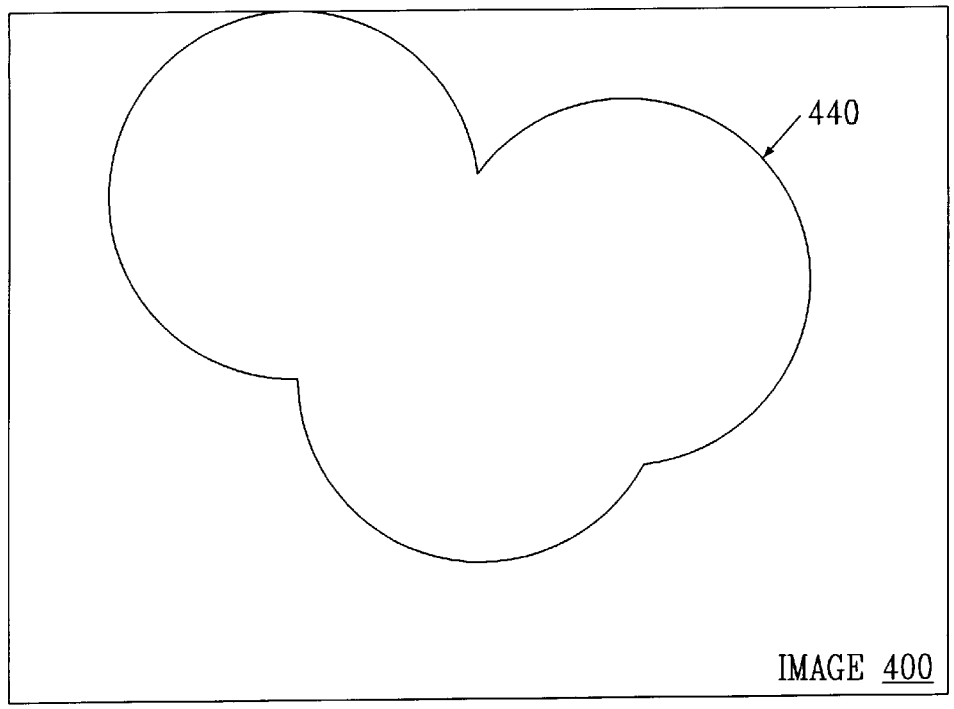
Figure 4E:
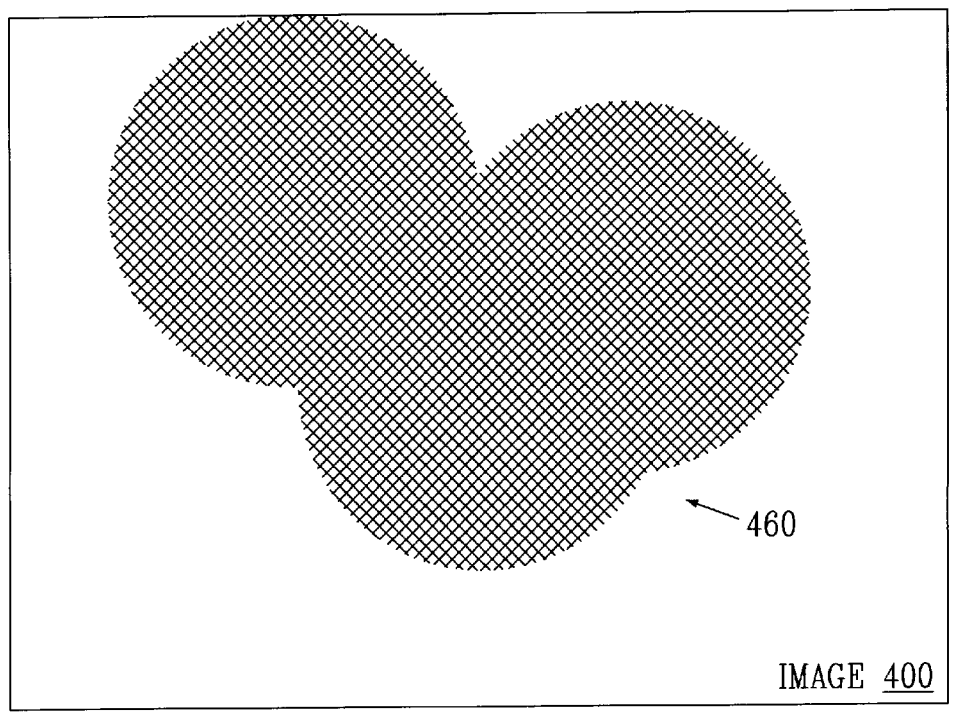

FIG. 4D depicts image 400 including only the outermost boundary 440. In the final step of the dilation process (step 340), an image-region growing method commonly known as "line scanning" is used to fill the area inside the outermost boundary 440. The resulting object 460, the dilation result of pixels 410 within the border 420, is illustrated in FIG. 4E. In accordance with conventional line-scanning techniques, an image is scanned from left-to-right and top-to-bottom. When a segment of a horizontal line is determined to be inside the object, all pixels in that line segment are marked as object pixels. As a result, the area within the object boundary is filled in.

Figure 1A:
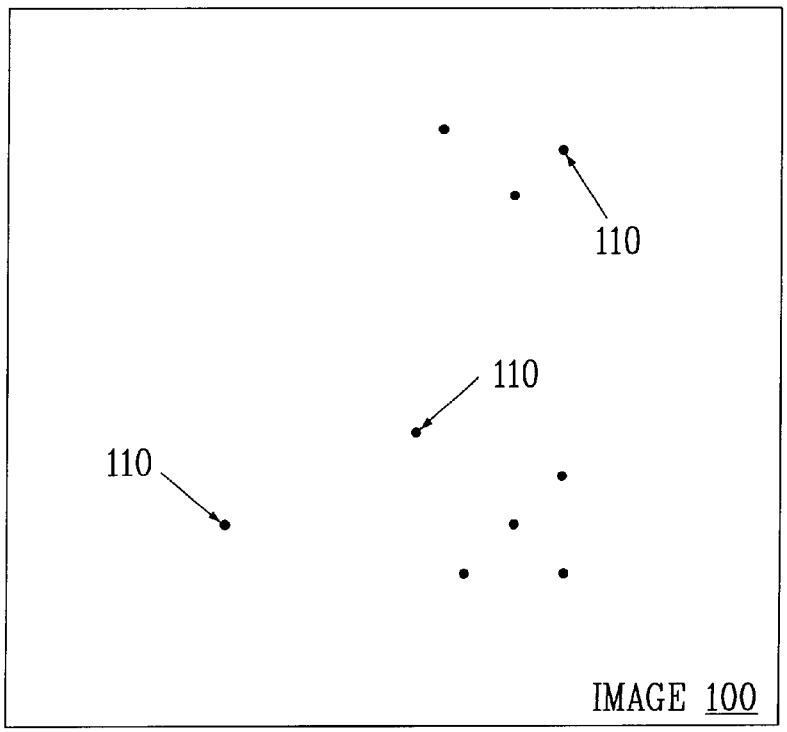
FIG. 1A depicts an image 100, which includes a plurality of random pixels 110, and a structuring element 120 of radius r.
Figure 1B:
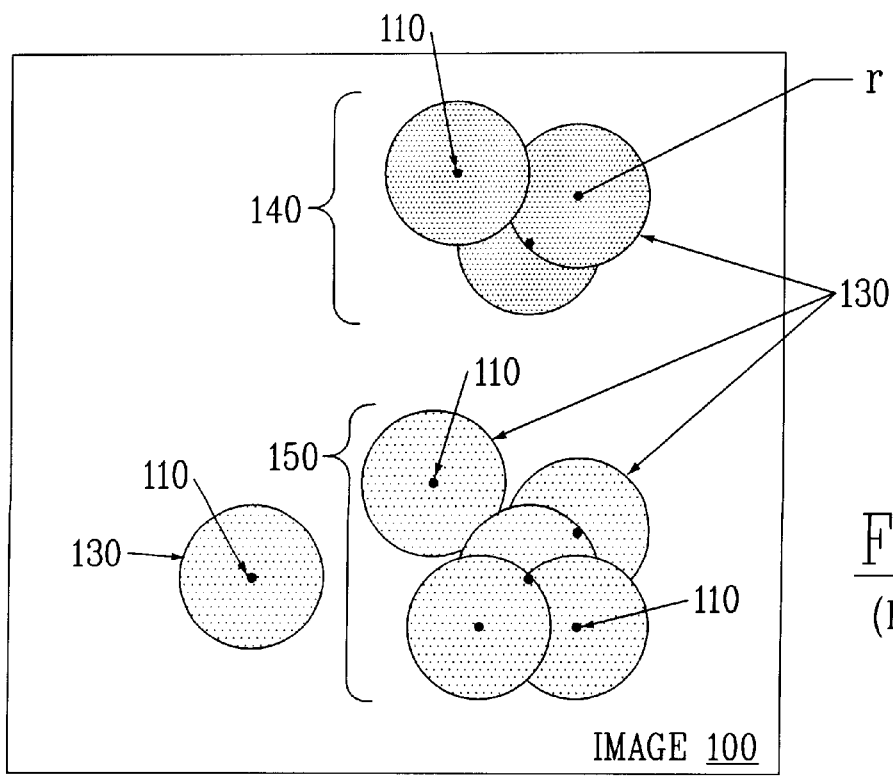
FIG. 1B depicts image 100 after dilation using element 120.
Figure 2A:
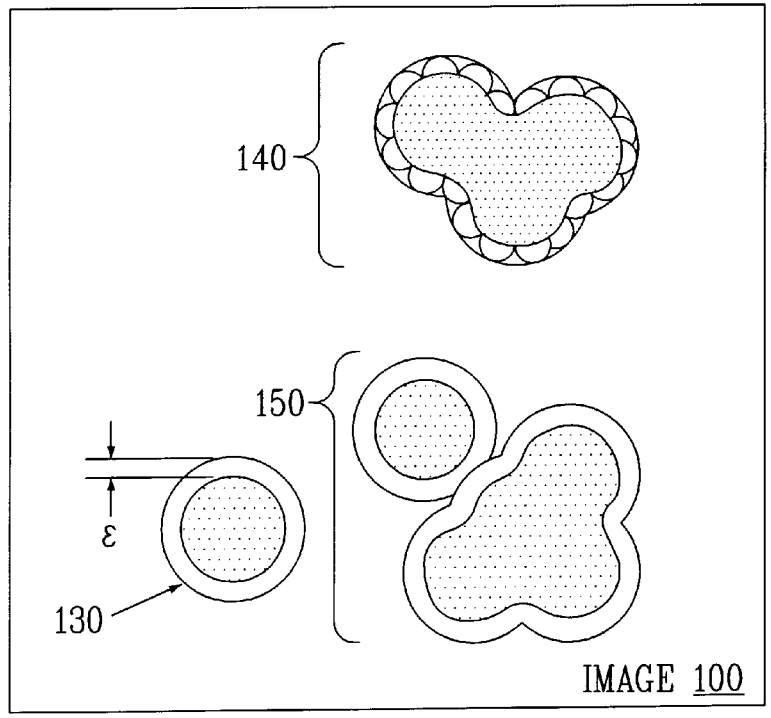
FIG. 2A depicts objects 140 and 150 and the isolated disk 130, all of FIG. 1B, undergoing a conventional erosion process.
Figure 2B:
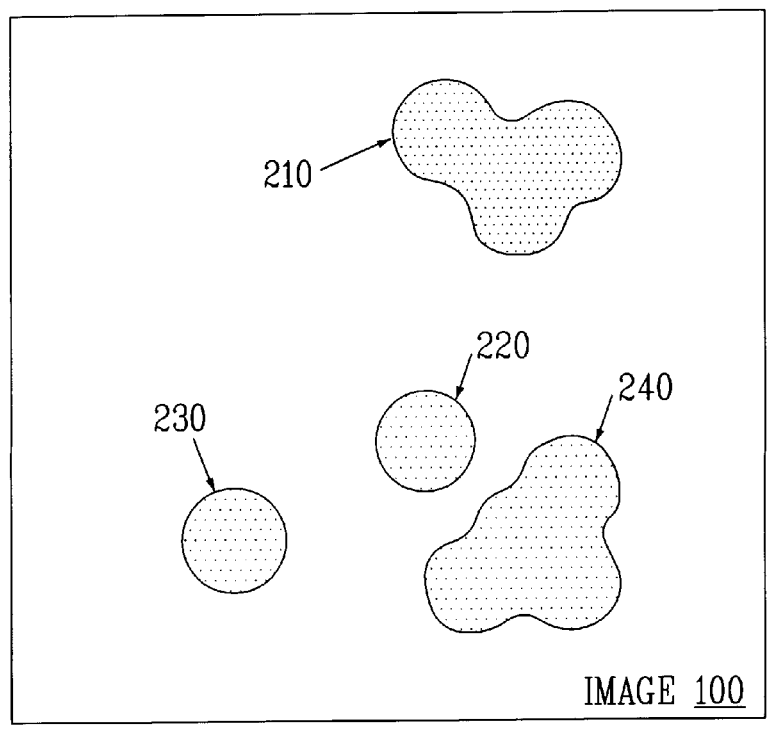
FIG. 2B depicts the eroded objects 210, 220, 230, and 240.

For an image of n pixels, the dilation method of FIGS. 3 and 4A–4E requires on the order of $n^2$ pixel comparisons. Consequently, the dilation method in accordance with the present invention offers significant time savings over conventional methods that, as discussed above in connection with FIGS. 1A and 1B, require on the order of $n^3$ pixel comparisons.

Figure 5:
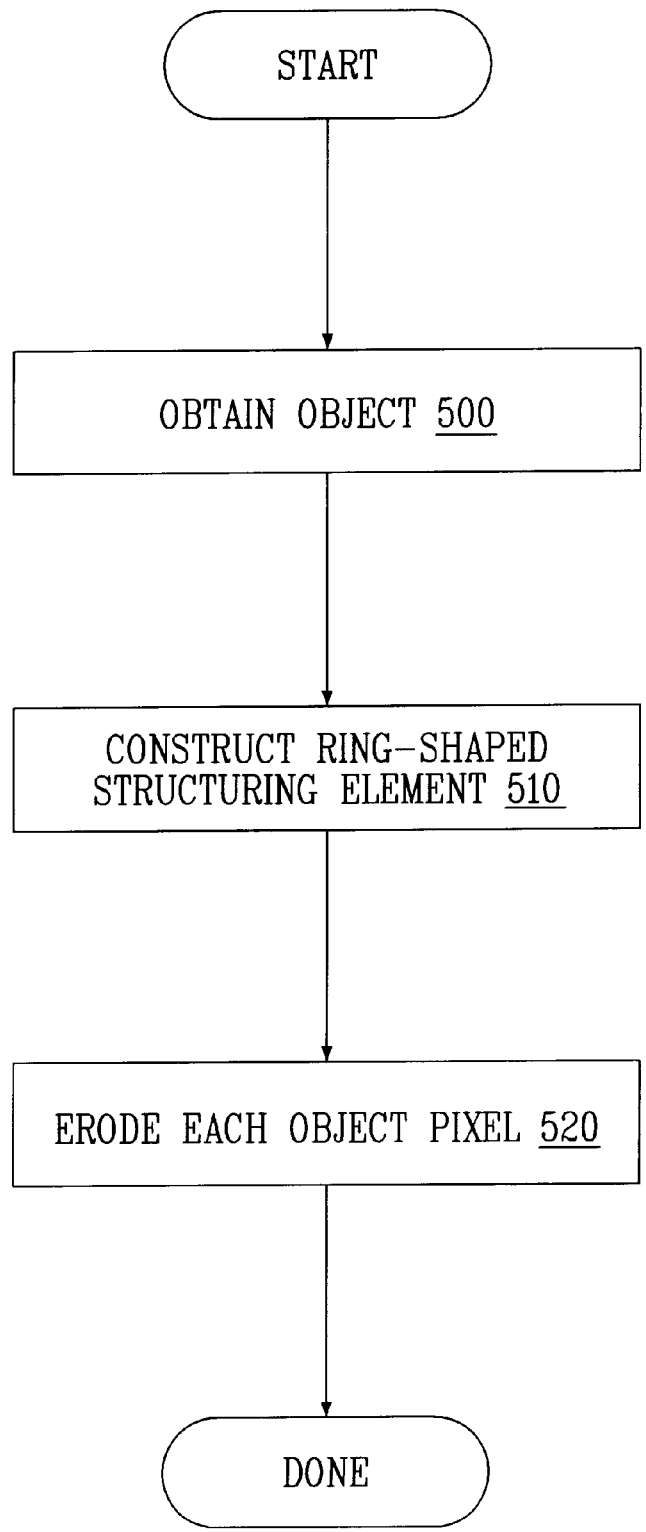
FIG. 5 is a flowchart depicting an erosion process in accordance with the present invention.
Figure 6A:
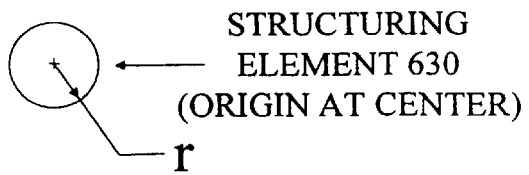
FIGS. 6A–6C graphically depict the erosion process of FIG. 5.

FIG. 5 is a flowchart depicting an erosion process in accordance with the present invention. Beginning at step 500, one (or more) object to be eroded is obtained and represented using conventional techniques. In the present example, the object to be eroded is the dilated object 460 of FIG. 4E. Next, in step 510 a ring-shaped structuring element 630 having a central origin and a radius r is constructed (FIG. 6A).

Figure 6B:
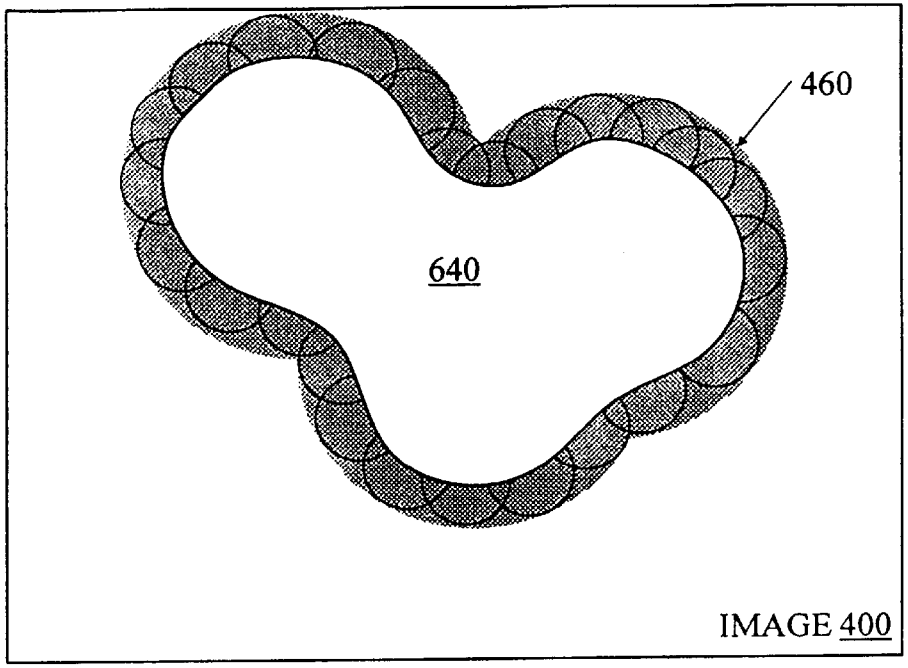
Figure 6C:
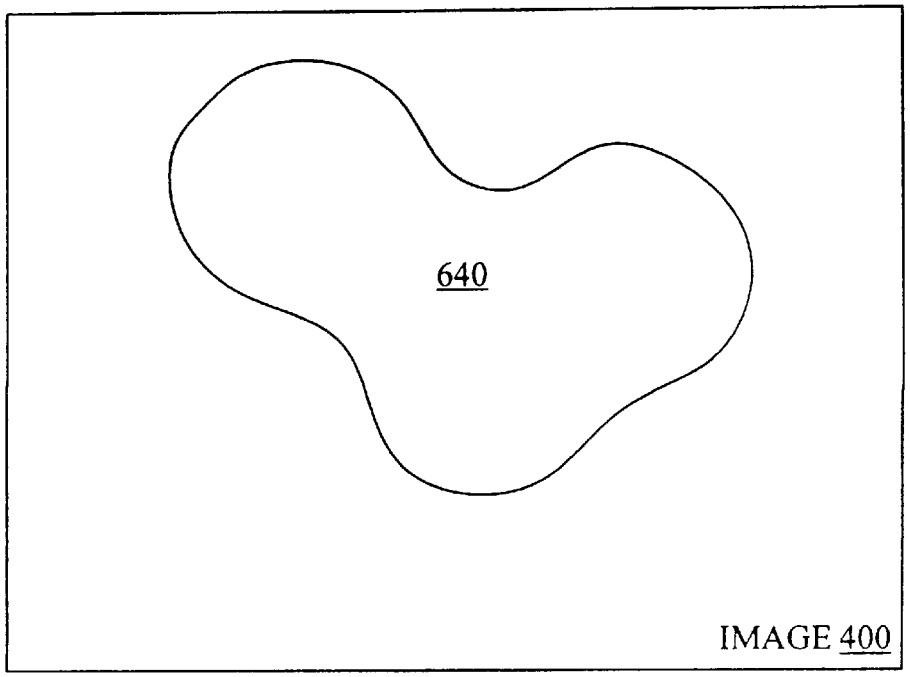

In accordance with an embodiment of the present invention, object 460 is eroded (step 520) by overlaying each pixel of image 400 with the origin of a copy of the structuring element 630. Alternatively, the origin of the copy may be overlaid on only those pixels within the boundary of object 460. In either case, pixels at the origin of a copy of the structuring element 630 are only selected if the ring-shaped boundary of the copy lies completely within the boundary of object 460. This is illustrated in FIG. 6B, in which portions of a number of exemplary copies of structuring element 630 are shown around the periphery of an eroded object 640. Copies of structuring element 630 with origins overlaying pixels within eroded object 640 are completely contained within the boundary of object 460. FIG. 6C depicts the final result of the erosion process of FIG. 5, the eroded object 640.

For an image of n pixels, the erosion method of FIGS. 5 and 6A–6C requires on the order of $n^2$ pixel comparisons. Consequently, the erosion method in accordance with the present invention offers significant time savings over conventional methods that, as discussed above in connection with FIGS. 1A and 1B, require on the order of $n^3$ pixel comparisons.

While the present invention has been described in connection with specific embodiments, variations of these embodiments will be obvious to those of ordinary skill in the art. For example, the structuring elements need not be circular, but may be of any desirable shape, and the origin of a structuring element need not be at the center of, or even within, the element. Furthermore, dilation and erosion are separate operations, and can be performed independently or in any order. Therefore, the spirit and scope of the appended claims should not be limited to the foregoing description of the preferred versions.

What is claimed is:

1. A method for dilating an object within an image, wherein the image is represented using a plurality of image pixels, and wherein the object is represented using a plurality of object pixels that are a subset of the plurality of image pixels, the method comprising:

specifying a structuring-element boundary and a structuring-element origin, wherein the structuring-element boundary includes a plurality of structuring-element boundary pixels;

overlaying the origin of a copy of the structuring element onto each of the image pixels such that the structuring-element boundaries of the copies intersect to form a dilated image feature having a feature boundary; and identifying the feature boundary.

2. The method of claim 1, further comprising filling an area bounded by the feature boundary.

3. The method of claim 2, wherein the area is filled by line scanning.

4. The method of claim 1, wherein the structuring element is a ring, and wherein the boundary of the structuring element is specified by radius.

5. The method of claim 1, wherein the boundary has a width of two pixels.

6. The method of claim 1, wherein the feature boundary is identified using chain coding.

7. A method for eroding an object within an image, wherein the image is represented using a plurality of image pixels, and wherein the object is represented using a plurality of object pixels that are a subset of the plurality of image pixels, the method comprising:

specifying a boundary and an origin of a structuring element, wherein the boundary includes a plurality of boundary pixels; and for each image pixel, overlaying a copy of the structuring element onto the pixel such that the origin of the copy is adjacent the image pixel;

comparing each boundary pixel with an adjacent ones of the image pixels; and selecting the image pixel if each of the boundary pixels overlaps an object pixel.

8. The method of claim 7, wherein the structuring element is a ring, and wherein the boundary of the structuring element is specified by radius.

9. The method of claim 7, wherein the boundary has a width of one image pixel.

10. A method for grouping selected pixels within an image represented using a plurality of image pixels, wherein the selected pixels are a subset of the plurality of image pixels, the method comprising:

specifying a first structuring-element having a first boundary and a first origin, wherein the first boundary includes a first plurality of structuring-element boundary pixels;

overlaying the origin of a copy of the first structuring element onto each of the selected pixels such that the first boundaries of the copies intersect to form a dilated image feature having a first feature boundary;

specifying a second structuring-element having a second boundary and a second origin, wherein the boundary includes a second plurality of boundary pixels; and for each image pixel within the first feature boundary, overlaying a copy of the structuring element onto the image pixel such that the second origin is adjacent the image pixel;

comparing the second boundary pixel with an adjacent one of the image pixels; and selecting the image pixel if each of the second boundary pixels is adjacent an image pixel within the first feature boundary.

* * * * *